United States Patent Office 3,034,473
Patented May 15, 1962

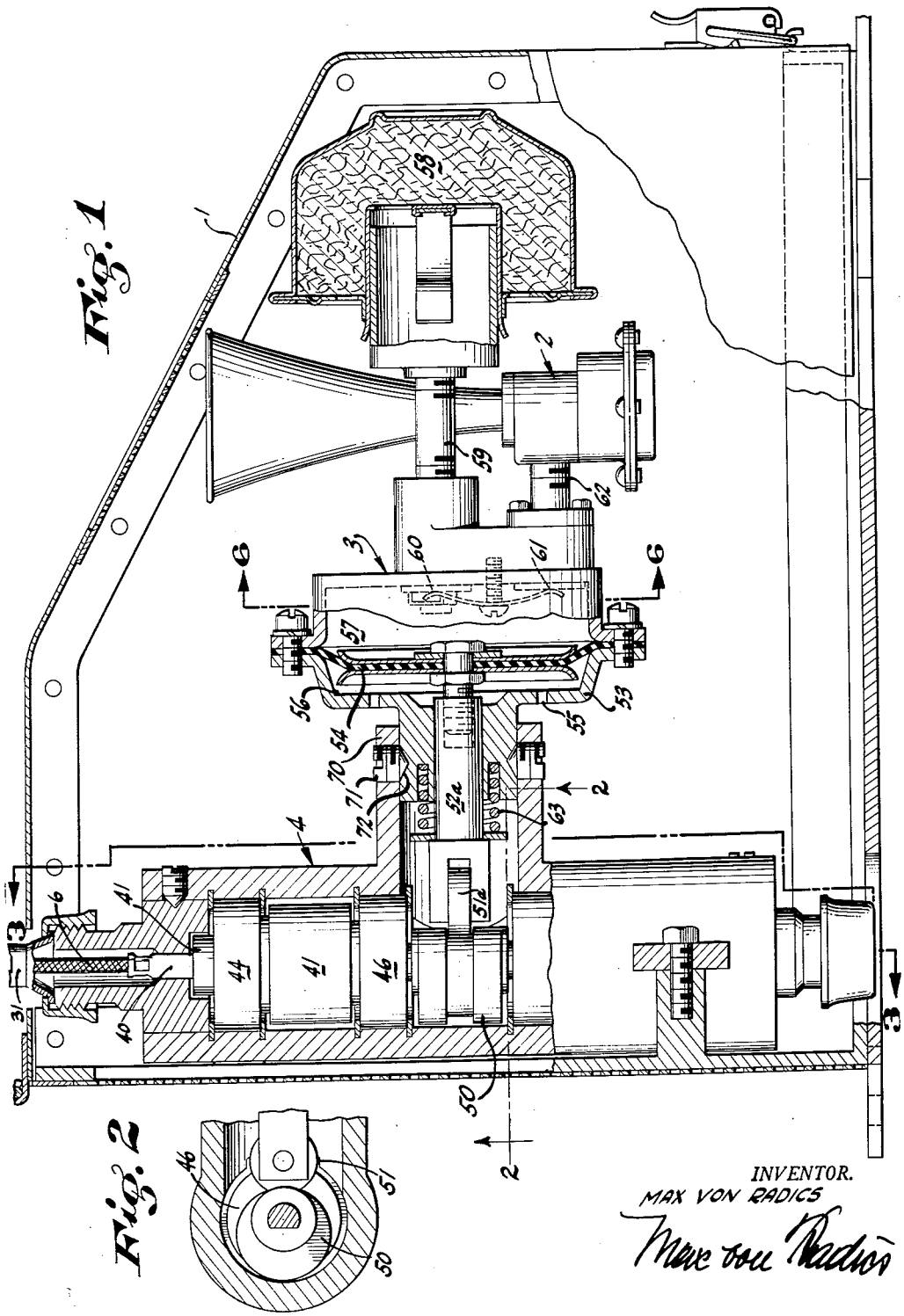

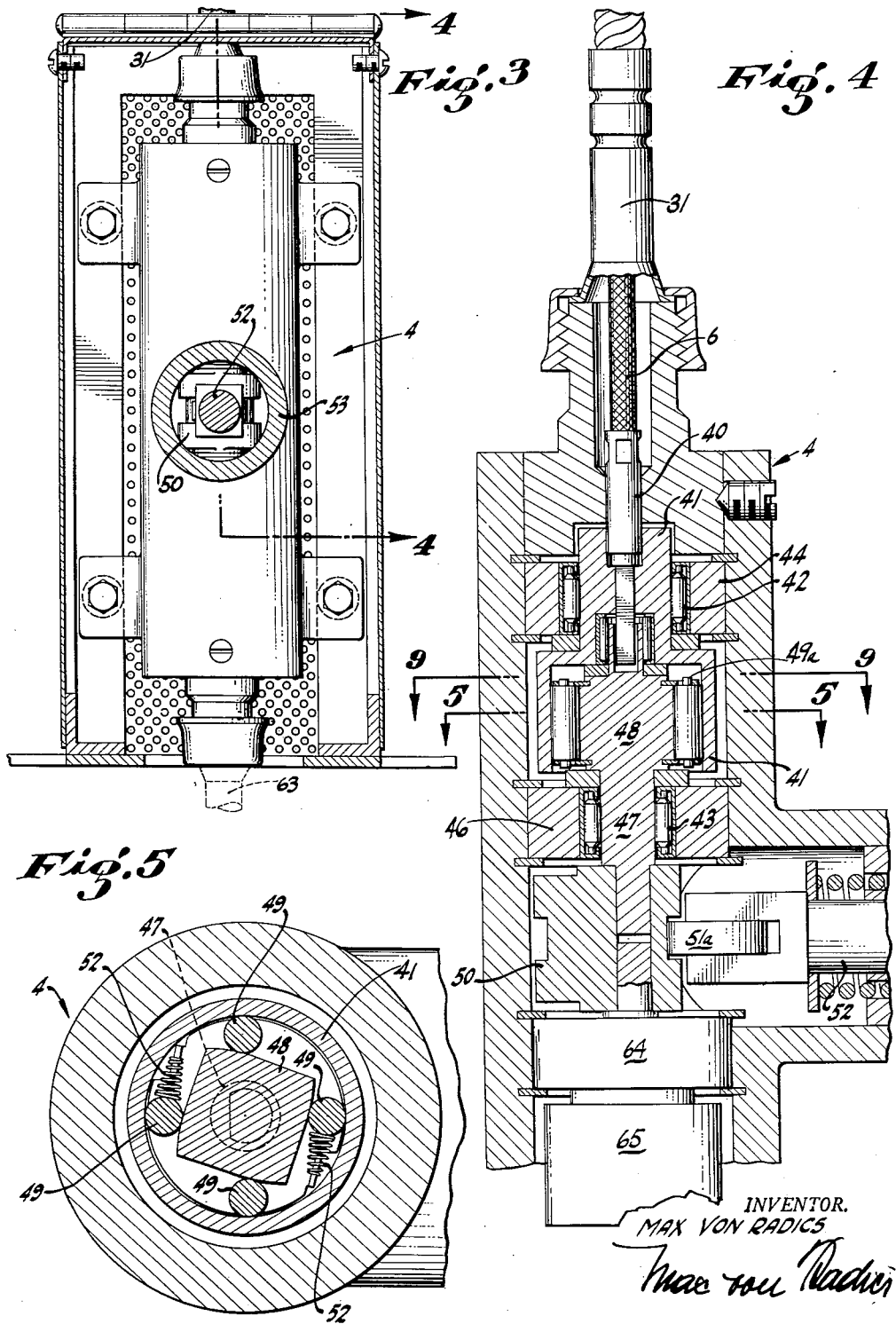

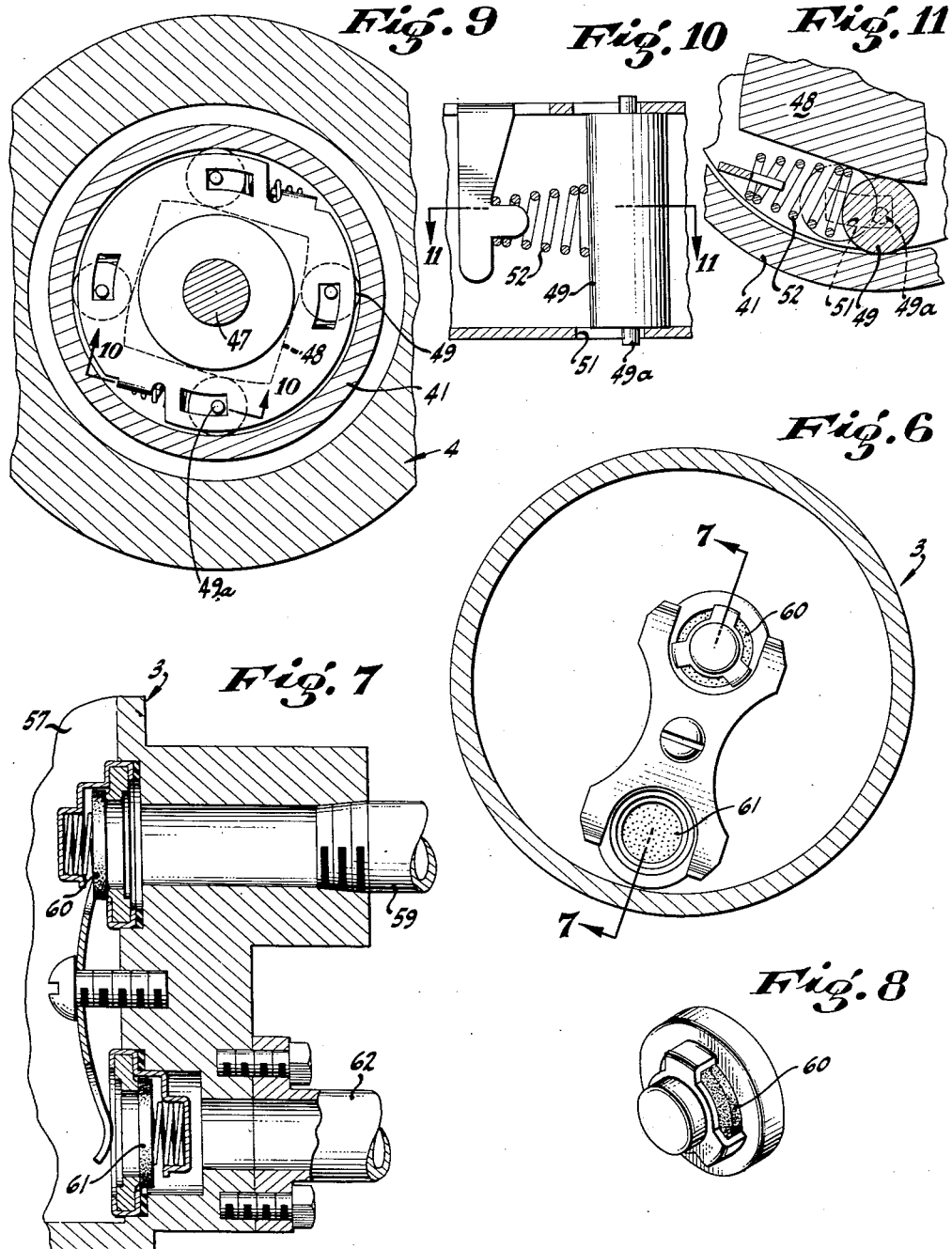

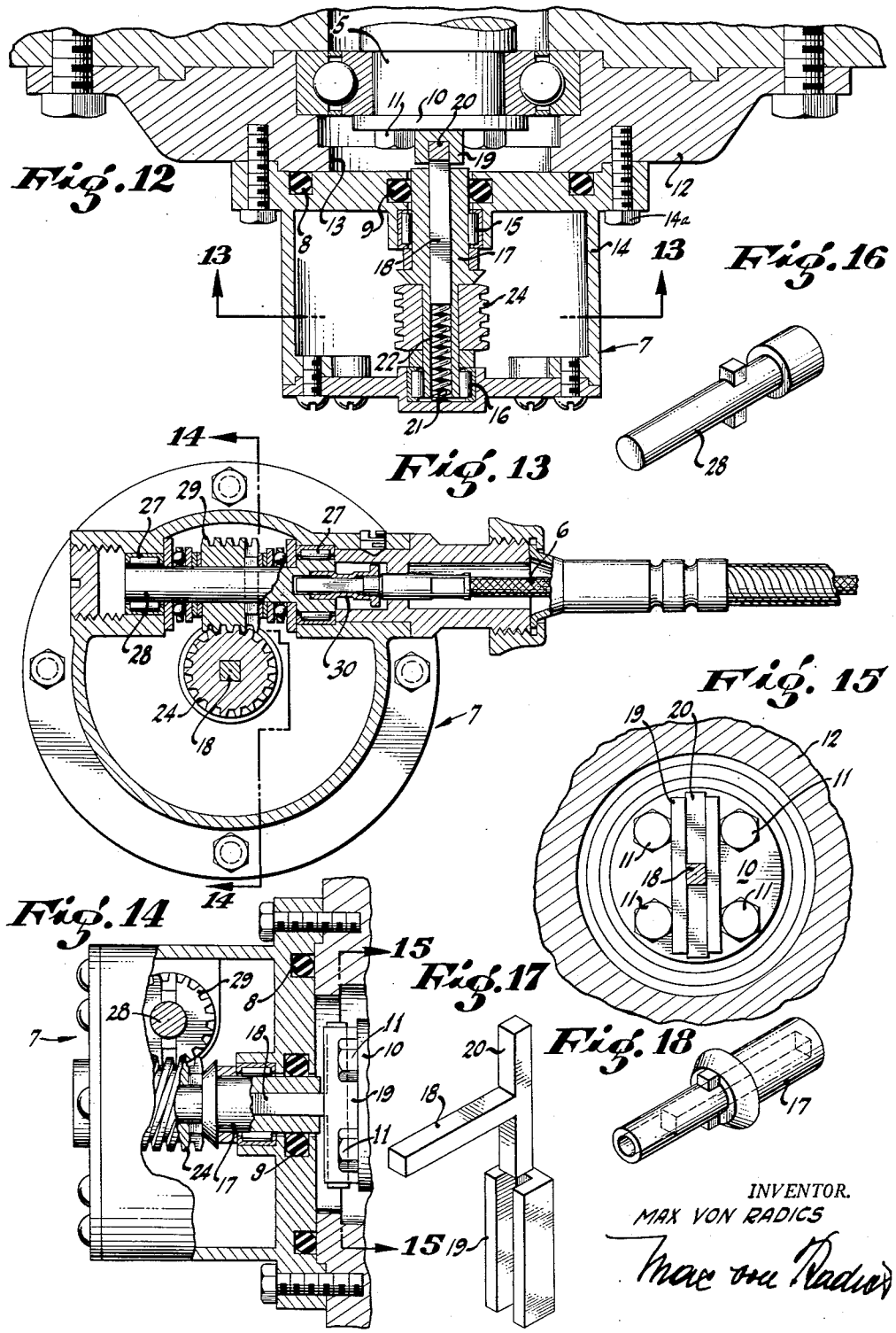

3,034,473
BACK-UP ALARM
Max von Radics, P.O. Box 2266, Anchorage, Alaska
Filed May 2, 1960, Ser. No. 26,202
6 Claims. (Cl. 116—59)

My invention relates to back-up alarms, and particularly to a back-up alarm for trucks, tractors and other heavy earth-moving vehicles, and by which sufficient power is taken off the pinion shaft to secure high potency warning blasts from an air horn, when the vehicle backs up.

In construction work such as building of roads or digging foundations for buildings or other construction work there are always several trucks, bulldozers, or other equipment in operation, sometimes in confined spaces, and many times in positions where backing of the vehicle would cause danger to nearby workmen.

It is, therefore, an object of my invention to produce an automatic, audible alarm system on the tractor or other vehicle so that once the tractor moves in reverse it will warn any person in the neighborhood that it is backing up.

Another object of this invention is to produce a back-up alarm which can be attached to a tractor or other vehicle, by connecting a flexible shaft to the pinion shaft of the vehicle, it being understood that the pinion shaft or other shaft as a primary source of power must be one which rotates when the tractor moves, regardless of whether or not the motor is turning over.

Another object of the invention is the provision of a drive mechanism for the signal horn capable of connection at opposite ends to the flexible main driving shaft, so that my device is adaptable for use with any vehicle, regardless of the direction in which the pinion shaft or take-off rotates.

Still another object of my invention is the provision of improved means for operating an air horn having a sound of such insistent penetration as to give ample warning above the most noisy of tractors and tractor motors.

Other objects and advantages of this invention will be readily apparent from the following detailed description of the preferred embodiment thereof.

In the drawings:

FIG. 1 is an elevation, partly in section, and showing the air horn, pump and the main unit of driving mechanism.

FIG. 2 is a cross sectional view taken in a plane indicated by the line 2—2 of FIG. 1.

FIG. 3 is a reduced vertical sectional view taken in a plane indicated by the line 3—3 of FIG. 1.

FIG. 4 is an enlarged vertical sectional view taken in a plane indicated by the line 4—4 of FIG. 3.

FIG. 5 is a further enlarged cross sectional view taken in the plane indicated by the line 5—5 of FIG. 4, but on a larger scale.

FIG. 6 is a vertical sectional view taken in the plane indicated by the line 6—6 of FIG. 1, but on a larger scale.

FIG. 7 is a sectional view taken in the plane indicated by the line 7—7 of FIG. 6, but on a larger scale.

FIG. 8 is a perspective view of one of the valves shown in FIG. 7.

FIG. 9 is a cross sectional view taken in the plane indicated by the line 9—9 of FIG. 4, but on a larger scale.

FIG. 10 is a fragmentary sectional view taken in the plane indicated by the line 10—10 of FIG. 9, but on a larger scale.

FIG. 11 is a fragmentary sectional view taken in the plane indicated by the line 11—11 of FIG. 10.

FIG. 12 is a horizontal sectional view showing the end of the pinion shaft of a tractor, and the cover plate thereof, assembled with the take-off unit comprising a portion of my invention.

FIG. 13 is a vertical sectional view taken in the plane indicated by the line 13—13 of FIG. 12.

FIG. 14 is an elevation largely in vertical section taken in the plane indicated by the line 14—14 of FIG. 13.

FIG. 15 is an elevation, partly in vertical section taken in the plane indicated by the line 15—15 of FIG. 14.

FIG. 16 is a perspective of a short shaft shown in FIG. 13 assembly.

FIG. 17 is a perspective of the T-bar and channel shown in FIG. 15 assembly.

FIG. 18 is a perspective of the hollow shaft shown assembled in FIGS. 12 and 14.

It is convenient to consider my back-up alarm as composed of a power take-off unit as illustrated in FIGS. 12, 13, and 14 and an operating unit as illustrated in FIGS. 1, 3 and 4, the two connected by a flexible shaft.

A back-up alarm, in accordance with my invention, comprises an outer housing 1, FIG. 1, in which air horn 2 is mounted and is operated by a bellows and valve mechanism generally indicated at 3.

The bellows mechanism 3 is actuated by a drive mechanism generally indicated at 4, FIG. 1, which is connected to the pinion shaft 5, FIG. 12, of a tractor by means of a flexible shaft 6, FIG. 13, connecting the drive mechanism 4 to a transmission unit 7 driven by the pinion shaft 5.

A tractor ordinarily has a pinion shaft 5, FIG. 12, which has a bearing retainer plate 10 on its outer end. The bearing retainer plate is held in position on the end of the pinion shaft by cap screws having hexagonal heads 11. Over the end of the pinion shaft and retainer plate is positioned a cover plate 12. To connect my invention to the pinion shaft, an aperture 13 is drilled in the cover plate, and a housing 14 is secured thereto by cap screws 14a. The housing has bearings 15 and 16 in which the hollow shaft 17 is journaled. The shaft has a square bore therethrough in which is slidably positioned a coupling link (FIGS. 12 and 17), formed by the square shaft 18 and head 20. The head 20 of the square shaft extends outwardly from opposite sides of the shaft into a channel 19 which engages the plate 10 between the screw heads 11, FIGS. 12 and 14. A spring 21 placed in the socket 22 in the shaft urges the T coupling link outwardly and holds the channel 19 in engagement with the bearing retainer plate 10, so that rotation of the pinion shaft and plate 10 will rotate the link and the shaft 17. This coupling of the two shafts allows for a slight error in axial alignment between them.

A safety precaution to prevent leakage of lubricant is provided by the O ring 8 and the oil seal 9. These prevent leakage of lubricating fluid from the transmission housing of the vehicle, through the joint between the unit 7 and the coverplate 12, or into the housing 14.

The housing 14 has bearings 27, FIG. 13, to journal the shaft 28, upon which is mounted a helical gear 29, which engages the gear 24. The shaft 28 has an ordinary speedometer coupling 30, attached thereto to connect with the flexible shaft 6, the other end of which is connected to the drive mechanism 4.

While the drawings show that the helical gears 24 and 29 FIGS. 12, 13 and 14, are of the same size so that equal speed is transmited from the pinion shaft 5 to the flexible shaft 6, in some vehicles the pinion speed is too fast to drive the alarm mechanism without reduction; therefore, the gear ratio may be changed as required.

The flexible shaft 6 has at its other end a similar speedometer coupling 31, which extends into the housing 1, FIG. 1, and into the connecting member 40, FIG. 4 so as to rotate the connecting member. The connecting member drives a clutch housing 41 which is rotatably mounted in the bearings 42, carried by a housing 44.

A shaft 47 is journalled in the bearings 43 disposed in a housing 46 and carries upon one end of it a rectangular clutch member 48, FIGS. 4 and 5. Four clutch rollers 49 are mounted on pins 49a, extending from their ends through slots 51, FIGS. 9, 10 and 11, on each side of the clutch member. The springs 52 urge the rollers 49 in a counterclockwise direction as viewed in FIG. 5.

When the clutch housing 41 is rotated counterclockwise the rollers 49, FIGS. 5 and 4, cause the housing 41 to similarly rotate the clutch member 48 and the shaft 47. Thus, when the tractor pinion 5 is connected to drive the clutch housing 41 clockwise (forward movement of the tractor) no motion is imparted to the member 48, but when rotation of the pinion 5 is reversed, which happens when the tractor moves backwardly, the clutch members engage as in FIG. 5 and impart motion to the clutch 48.

When the clutch member 48 is rotated, the eccentric 50, carried on the shaft 47, rotates and oscillates the cam rider 51a rotatably mounted in the fork of the plunger 52a which oscillates in the diaphragm housing 53 to actuate the diaphragm 54, FIG. 1.

A spring 63 maintains the cam rider against the eccentric 50. Vent holes 55 permit air to circulate in and out of the diaphragm chamber 56. The chamber 57 on the opposite side of the diaphragm receives air through the air filter 58, the tube 59, FIGS. 1 and 7 and the spring loaded one-way valve 60. On the reciprocating stroke the one-way valve 61 opens to allow air to pass through the tube 62 to the air horn 2 causing it to emit a penetrating blast of high intensity. The horn can be of any type actuated by a blast of air.

The filter 58, FIG. 1, is desirable because on most tractor and bulldozer work there is a great deal of dust and dirt in the air which would injure the mechanism in the horn.

On some vehicles the pinion shaft may rotate in the opposite direction (counterclockwise) to that assumed in the above description; and for this reason a second drive mechanism is provided, identical to that described above, but extending from the centrally located eccentric 50 in the opposite direction (lower end of FIG. 4).

In such a case the flexible drive shaft 6 is disconnected from the mechanism shown in FIGS. 3 and 4; and connected into the opposite end, as suggested by the dotted lines 63 at the lower end of FIG. 3, and the roller bearing and clutch housings 64 and 65 at the lower end of FIG. 4. It will be understood that connecting the drive shaft 6 into the opposite end of the unit, in itself reverses the direction of drive of the unit. Since the pinion or primary shaft is now assumed to be rotating counterclockwise, the shifting of the flexible shaft effects a second reversal and a return to the same clockwise rotation of the eccentric 50 as first described when the vehicle is moving backwardly.

To permit the alignment of the horn in the proper direction relative to the vehicle, the set screws 71 which engage the flange 72 on the diaphragm housing 53 to hold it permanently in alignment within the collar 70, can be loosened and the bellows and horn assembly turned as desired.

I claim:

1. An alarm mechanism for tractors and the like having a pinion shaft comprising, an air horn, an air pump having a reciprocating plunger and operatively connected to said horn, a rotatable drive mechanism for said plunger, flexible means for connecting said drive mechanism and said pinion shaft for rotation together, and means including a one-way clutch in said drive mechanism to actuate said plunger when said pinion shaft is rotated in one direction and to leave said plunger at rest when said pinion shaft is rotated in the opposite direction.

2. A back-up alarm driving means for taking power from a primary shaft rotatable within a first housing, comprising a second housing secured to the first housing and having an aperture therein opening over the end of the primary shaft, a second shaft journaled in the second housing, means for connecting the primary shaft and the second shaft for rotation together, another shaft remote from the second shaft and including a one-way clutch, an air pump operatively connected to said other shaft, means including a flexible shaft for connecting the second shaft and said other shaft for rotation together, and an air horn actuated by air from the pump.

3. Mechanism for taking power from a primary shaft rotatably journaled within a first housing having an opening opposite the end of the shaft, comprising a second housing secured to the first housing and having an aperture therein opening over the end of the primary shaft, a second shaft journaled in the second housing, means for connecting the primary shaft and the second shaft for rotation together, a third shaft journaled in the second housing, meshed gears disposed on the second and third shafts for rotation of the third shaft at a selected ratio to rotation of the primary shaft, an air pump, another shaft including a one-way clutch for operating the pump, means for connecting the third shaft to said other shaft for rotation together, and an air horn actuated by air from the pump.

4. Mechanism for taking power from a primary shaft rotatably journaled within a first housing having an opening opposite the end of the shaft, comprising a second housing secured to the first housing and having an aperture therein opening over the end of the primary shaft, a hollow shaft journaled in the second housing, means nonrotatably slidable in the hollow shaft and engaging the end of the primary shaft, means on the end of the primary shaft engaging the nonrotatable means for rotation of primary and hollow shafts together, a third shaft journaled in the second housing, meshed gears disposed on the second and third shafts for rotation of the third shaft at a selected ratio to rotation of the primary shaft, an air pump, another shaft including a one-way clutch for operating the pump, means for connecting the third shaft to said other shaft for rotation together, and an air horn actuated by air from the pump.

5. Mechanism for taking power from a primary shaft rotatably journaled within a first housing having an opening opposite the end of the shaft, comprising a second housing secured to the first housing and having an aperture therein opening over the end of the primary shaft, a plurality of lugs projecting from the end of the shaft, a hollow shaft journaled in the second housing, a coupling link nonrotatably slidable within the hollow shaft, a head on the link engaged between the lugs to connect the primary and hollow shafts for rotation together, a third shaft journaled in the second housing, meshed gears disposed on the hollow and third shafts for rotation together, an air pump, another shaft including a one-way clutch for operating the pump, means for connecting the third shaft to said other shaft for rotation together, and an air horn actuated by air from the pump.

6. Mechanism for taking power from a primary shaft rotatable within a first housing, comprising a cover plate secured to the first housing over the end of a the primary shaft and having an aperture therein opening over the end of the primary shaft, a second housing fixedly secured to the cover plate, a hollow shaft journaled in the second housing and axially aligned with the primary shaft, means including a coupling link nonrotatably slidable in the hollow shaft and having a head thereon extending across the end of the primary shaft, and a lug on the primary shaft engageable with the head of the coupling link for rotating the link and its associated hollow shaft when the primary shaft rotates, a third shaft journaled in the second housing at an angle across the hollow shaft, and meshed gears arranged on the hollow and third shafts to drive the third shaft from the hollow shaft.

References Cited in the file of this patent

UNITED STATES PATENTS

| | | |
|---|---|---|
| 2,633,951 | Ayer | Apr. 7, 1953 |
| 2,979,020 | Von Radics | Apr. 11, 1961 |

FOREIGN PATENTS

| | | |
|---|---|---|
| 4,593 | Great Britain | 1880 |